(12) United States Patent
Hirase et al.

(10) Patent No.: US 12,434,549 B2
(45) Date of Patent: Oct. 7, 2025

(54) WORK VEHICLE

(71) Applicant: KUBOTA CORPORATION, Osaka (JP)

(72) Inventors: Yuji Hirase, Sakai (JP); Sumio Yagyu, Sakai (JP); Kazuto Okazaki, Sakai (JP); Tsunehiro Ii, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 230 days.

(21) Appl. No.: 18/081,739

(22) Filed: Dec. 15, 2022

(65) Prior Publication Data

US 2023/0286369 A1    Sep. 14, 2023

(30) Foreign Application Priority Data

Mar. 11, 2022 (JP) ................................ 2022-038615
Mar. 11, 2022 (JP) ................................ 2022-038616

(51) Int. Cl.
*B60K 6/365*        (2007.10)
*B60K 6/405*        (2007.10)
(Continued)

(52) U.S. Cl.
CPC ............. *B60K 6/405* (2013.01); *B60K 6/365* (2013.01); *B60K 6/442* (2013.01); *B60K 6/547* (2013.01); *F16H 57/021* (2013.01); *B60Y 2200/92* (2013.01); *F16H 2057/02034* (2013.01); *F16H 2057/02056* (2013.01)

(58) Field of Classification Search
CPC ........ B60K 6/405; B60K 6/365; B60K 6/442; B60K 6/547; B60K 2006/4825; B60K 6/48; B60K 6/387; F16H 57/021; F16H 2057/02034; F16H 2057/02056; B60W 2300/152
See application file for complete search history.

(56) References Cited

U.S. PATENT DOCUMENTS 6,146,302 A    11/2000  Kashiwase
6,558,283 B1 *  5/2003  Schnelle ................ B60K 6/445
                                               903/910
(Continued)

FOREIGN PATENT DOCUMENTS

DE    102007057597 A1 *  7/2009  ............... B60K 5/08
EP       1 232 892 A2      8/2002
(Continued)

OTHER PUBLICATIONS

Official Communication issued in corresponding European Patent Application No. 22213603.8, mailed on Jul. 11, 2023.
(Continued)

*Primary Examiner* — Tisha D Lewis
(74) *Attorney, Agent, or Firm* — Keating & Bennett, LLP

(57) ABSTRACT

A hybrid transmission includes an electric transmission and a gear transmission. The electric transmission includes a first motor generator and a second motor generator. The second motor generator is on a side of the first motor generator on which side the gear transmission is located. An output transmission to transmit the output from the second motor generator to the gear transmission is on the side of the second motor generator on which side the gear transmission is located.

10 Claims, 5 Drawing Sheets

(51) Int. Cl.
  *B60K 6/442* (2007.10)
  *B60K 6/547* (2007.10)
  *F16H 57/021* (2012.01)
  *F16H 57/02* (2012.01)

(56) References Cited

U.S. PATENT DOCUMENTS

| | | | |
|---|---|---|---|
| 9,981,665 B2* | 5/2018 | Rekow | B60W 10/24 |
| 2007/0149338 A1 | 6/2007 | Ebner et al. | |
| 2009/0170649 A1* | 7/2009 | Murakami | F16H 3/728 |
| | | | 475/5 |
| 2016/0201295 A1* | 7/2016 | Kishimoto | B60W 10/182 |
| | | | 903/903 |
| 2018/0111467 A1* | 4/2018 | Duan | B60K 6/365 |
| 2022/0250607 A1* | 8/2022 | McKinzie | F16D 48/06 |

FOREIGN PATENT DOCUMENTS

| | | |
|---|---|---|
| EP | 3 312 035 A1 | 4/2018 |
| JP | 11-217025 A | 8/1999 |
| JP | H11313407 A | 11/1999 |
| JP | 2013-147235 A | 8/2013 |
| JP | 2014-065349 A | 4/2014 |
| JP | 2018083615 A | 5/2018 |
| WO | 2006012995 A1 | 2/2006 |

OTHER PUBLICATIONS

Official Communication issued in corresponding European Patent Application No. 22213603.8, mailed on Jan. 14, 2025, 5 pages.
Official Communication issued in corresponding Japanese Patent Application No. 2022-038615, mailed on May 27, 2025, 2 pages.

* cited by examiner

WORK VEHICLE

CROSS REFERENCE TO RELATED APPLICATIONS

This application claims the benefit of priority to Japanese Patent Application No. 2022-038615 filed on Mar. 11, 2022 and Japanese Patent Application No. 2022-038616 filed on Mar. 11, 2022. The entire contents of these applications are hereby incorporated herein by reference.

BACKGROUND OF THE INVENTION

1. Field of the Invention

The present invention relates to a work vehicle such as a riding mower.

2. Description of the Related Art

As the abovementioned work vehicle, there is a tractor described in Japanese Unexamined Patent Application Publication No. 2014-65349, for example. The tractor described in Japanese Unexamined Patent Application Publication No. 2014-65349 includes an engine and a hybrid transmission. The hybrid transmission includes an electric transmission portion and a gear transmission portion such that the electric transmission portion and the gear transmission portion are disposed along a vehicle-body front-rear direction. The electric transmission portion includes a motor generator portion (a motor generator), and the gear transmission portion includes a gear driving mechanism (a planetary gear mechanism, a forward-reverse switching device, a gear shifter) without a motor generator. The hybrid transmission is configured to vary power from the engine and output the power to travel devices (front wheels, rear wheels). The hybrid transmission is accommodated in a transmission case provided in a vehicle body in a state where the hybrid transmission is side by side with the engine along the vehicle-body front-rear direction.

SUMMARY OF THE INVENTION

In the related art, when the motor generator works as an electric machine configured to drive the travel devices, a large charge battery having a large charge capacity is required to prevent shortage of electric power to be supplied to drive the motor generator.

Preferred embodiments of the present invention provide work vehicles each of which avoids upsizing of a charge battery and achieves simplification of a power transmission structure to a gear transmission while the work vehicle includes a motor generator with high output and which can drive travel devices by an engine and a motor generator working as an electric machine while the work vehicle supplies electric power to the motor generator without shortage of electric power.

A preferred embodiment of the present invention provides a work vehicle which avoids upsizing of a charge battery and makes it easy to perform maintenance on a motor generator while the work vehicle includes a motor generator with high output and which can drive travel devices by an engine and a motor generator working as an electric machine while the work vehicle supplies electric power to the motor generator without shortage of electric power.

A work vehicle according to a preferred embodiment of the present invention includes an engine, a hybrid transmission including an electric transmission, and a gear transmission, the electric transmission and the gear transmission being positioned along a vehicle-body front-rear direction, the electric transmission portion including a motor generator, the gear transmission including a gear driver without a motor generator, the hybrid transmission being operable to vary power from the engine and output the power to a travel device, and a transmission case in which the hybrid transmission is accommodated, the transmission case being provided in a vehicle body in a state where the transmission case is side by side with the engine along the vehicle-body front-rear direction. The electric transmission portion includes a first motor generator and a second motor generator and is on a side of the gear transmission on which side the engine is located. The first motor generator is on the side of the second motor generator on which side the engine is located. The second motor generator is on a side of the first motor generator on which side the gear transmission portion is located. The work vehicle further includes, on a side of the second motor generator on which side the gear transmission is located, an output transmission connecting the second motor generator to an input of the gear transmission to transmit an output from the second motor generator to the input.

In this configuration, the first motor generator and the second motor generator are positioned along the vehicle-body front-rear direction. Accordingly, it is possible to avoid expansion of the transmission case in the vehicle-body width direction and in the vehicle-body up-down direction and to increase the outside diameters of the first and second motor generators.

In a case where the second motor generator works as an electric machine to output power the toward travel devices, the first motor generator can be caused to work as a generator, and generated electric power can be used to drive of the second motor generator working as the electric machine. Accordingly, even in a case of using a charge battery with a small charge capacity in comparison with a case where electric power is supplied from a charge battery in a state where no electric power is generated, it is possible to supply electric power to the second motor generator working as the electric machine without shortage of the electric power.

Since the output transmission mechanism is on the side of the second motor generator on which side the gear transmission portion is located, it is not necessary to arrange the output transmission mechanism to detour around the second motor generator in comparison with a case where the output transmission mechanism is on a side of the second motor generator on which side the first motor generator is located. Thus, it is possible to simplify the output transmission mechanism.

That is, while the first and second motor generators with high output are included, it is possible to avoid upsizing of a charge battery and to simplify the output transmission to transmit power from the second motor generator to the gear transmission, and further, it is possible to drive the travel devices by the engine and the second motor generator while electric power is supplied to the second motor generator working as the electric machine without shortage of the electric power.

In a preferred embodiment of the present invention, it is preferable that the work vehicle includes an input transmission connecting an input shaft of the transmission case to the first motor generator to input power from the input shaft into the first motor generator, and the input transmission is on the side of the first motor generator on which side the engine is located.

In this configuration, in comparison with a case where the input transmission is between the first motor generator and the second motor generator, the first motor generator and the second motor generator are easily provided collectively, and an electric system to be connected to the first motor generator and an electric system to be connected to the second motor generator are easily provided collectively in a compact manner. Further, even in a case where the first motor generator remains assembled, it is possible to perform an operation to inspect the input transmission from a side opposite to the side where the second motor generator extends across the first motor generator, so that a maintenance operation on the input transmission mechanism is easily performed.

In a preferred embodiment of the present invention, it is preferable that the input transmission be operable to increase the power from the input shaft and transmit the power to the first motor generator.

In this configuration, the power from the input shaft is increased in speed and transmitted to the first motor generator by the input transmission, so that the first motor generator is driven. Accordingly, it is possible to achieve the first motor generator having a small size with a small outside diameter without decreasing the power generation performance of the first motor generator. Further, even in a case where the structure of the input transmission mechanism is complicated due to a speed increasing function, the input transmission is located on a side opposite to the side where the second motor generator extends across the first motor generator. Accordingly, the input transmission is easily incorporated.

In a preferred embodiment of the present invention, it is preferable that the first motor generator and the second motor generator are rotatable coaxially with the input shaft.

With this configuration, the first motor generator, the second motor generator, and the input shaft are positioned collectively in the vehicle-body width direction and in the vehicle-body up-down direction. Accordingly, it is possible to compactify the electric transmission portion such that the electric transmission portion does not expand so much in the vehicle-body width direction and in the vehicle-body up-down direction.

In a preferred embodiment of the present invention, it is preferable that the engine is in a front portion of the vehicle body, and the transmission case is behind the engine.

In this configuration, the load of the engine is applied to the front portion of the vehicle body, so that it is possible to achieve a hybrid work vehicle in a state where the weights of the vehicle body on the front side and on the rear side can be easily balanced even when a work device is connected to a rear portion of the vehicle body.

A work vehicle according to a preferred embodiment of the present invention includes an engine, a hybrid transmission including an electric transmission, and a gear transmission, the electric transmission and the gear transmission positioned along a vehicle-body front-rear direction, the electric transmission including a motor generator, the gear transmission including a gear driving without a motor generator, the hybrid transmission being operable to vary power from the engine and output the power to travel devices, and a transmission case in which the hybrid transmission is accommodated, the transmission case being provided in a vehicle body in a state where the transmission case is side by side with the engine along the vehicle-body front-rear direction. The electric transmission includes a first motor generator and a second motor generator and is provided between the engine and the gear transmission. The first motor generator and the second motor generator are provided in a state where a first rotation axis of the first motor generator and a second rotation axis of the second motor generator are positioned along the vehicle-body front-rear direction, and the first rotation axis and the second rotation axis are parallel or substantially parallel to each other. The transmission case includes an input shaft extending in the vehicle-body front-rear direction between the first motor generator and the second motor generator.

In this configuration, the first rotation axis of the first motor generator along the vehicle-body front-rear direction and the second rotation axis of the second motor generator along the vehicle-body front-rear direction are parallel or substantially parallel to each other. Accordingly, even in a case where, in comparison with a case where the first rotation axis and the second rotation axis are positioned in the vehicle-body front-rear direction, the outside diameters of the first and second motor generators are made small such that the first and second motor generators and the input shaft can be accommodated in the transmission case while expansion of the outside diameter of the transmission case is avoided, it is possible to increase the lengths of the first and second motor generators along the vehicle-body front-rear direction, thus making it possible to achieve motor generators with high output without a decrease in output due to the small diameters of the first and second motor generators.

In a case where either one of the first motor generator and the second motor generator works as an electric machine to output power toward the travel devices, the other one of the first motor generator and the second motor generator is caused to work as a generator, so that generated electric power can be used to drive the motor generator working as the electric machine. Accordingly, in comparison with a case where electric power is supplied from a charge battery in a state where no electric power is generated, even in a case where a charge battery with a small charge capacity is used, the electric power can be supplied to the motor generator working as the electric machine without shortage of the electric power.

The first rotation axis of the first motor generator along the vehicle-body front-rear direction and the second rotation axis of the second motor generator along the vehicle-body front-rear direction are parallel or substantially parallel to each other. Accordingly, even in a case where the first and second motor generators remain assembled, it is possible to perform inspection or the like on the first and second motor generators from the near side in a direction along the rotation axis relative to the first and second motor generators.

That is, while the first and second motor generators with high output are used, it is possible to avoid upsizing of a charge battery and make it easy to perform maintenance on the first and second motor generators. Further, it is possible to drive the travel devices by the engine and the motor generator working as the electric machine while electric power is supplied to the motor generator working as the electric machine without shortage of the electric power.

In a preferred embodiment of the present invention, it is preferable that the first rotation axis and the second rotation axis extend in a direction along a vehicle-body width direction in a state where the first rotation axis and the second rotation axis are parallel or substantially parallel to each other, and the input shaft extends along the vehicle-body front-rear direction above or below the first rotation axis and the second rotation axis.

In this configuration, since the first motor generator and the second motor generator have circular or substantially circular outer peripheral shapes, a gap expanding upward is defined between a portion of the first motor generator above the first rotation axis and a portion of the second motor generator above the second rotation axis, and a gap expanding downward is defined between a portion of the first motor generator below the first rotation axis and a portion of the second motor generator below the second rotation axis. The input shaft is located in the gap expanding upward or the gap expanding downward. Accordingly, in comparison with a case where the input shaft and the first rotation axis are located at the same position and the input shaft and the second rotation axis are located at the same position in the vehicle-body up-down direction, the first motor generator and the second motor generator are easily provided collectively in the vehicle-body width direction, thus making it possible to increase the outside diameters of the first motor generator and the second motor generator.

In a preferred embodiment of the present invention, it is preferable that the input shaft extends along the vehicle-body front-rear direction above the first rotation axis and the second rotation axis, and the input shaft includes an upper end above an upper end of the first motor generator and above an upper end of the second motor generator.

In this configuration, the input shaft is in an upper portion of the gap expanding upward between the portion of the first motor generator above the first rotation axis and the portion of the second motor generator above the second rotation axis. Accordingly, the first motor generator and the second motor generator are easily disposed collectively in the vehicle-body width direction, thus making it possible to further increase the outside diameters of the first motor generator and the second motor generator. Since the input shaft extends above the first rotation axis and the second rotation axis, it is not necessary to place the input shaft at a very low position inside the transmission case, and thus, the input shaft is easily positioned.

In a preferred embodiment of the present invention, it is preferable that the first motor generator and the second motor generator have different outside diameters.

In this configuration, even in a case where the outside diameter of the first motor generator working as the generator is smaller than the outside diameter of the second motor generator working as the electric machine to drive the travel devices, when electric power can be supplied to the second motor generator without shortage of the electric power, it is possible to achieve a cost reduction in comparison with a case where the first and second motor generators have the same outside diameter.

In a preferred embodiment of the present invention, it is preferable that the gear transmission includes a low-speed planetary transmission to output combined power on a low-speed side by combining engine power from the input shaft with motor power from the second motor generator, and a high-speed planetary transmission to output combined power on a high-speed side with a speed higher than the combined power on the low-speed side by combining the engine power from the input shaft with the motor power from the second motor generator. It is preferable that either one of the low-speed planetary transmission and the high-speed planetary transmission include a rotation axis coinciding with the first rotation axis of the first motor generator, and the other one of the low-speed planetary transmission and the high-speed planetary transmission include a rotation axis coinciding with the second rotation axis of the second motor generator.

In this configuration, the power from the engine and the power from the second motor generator are combined by the low-speed planetary transmission to generate combined power on the low-speed side, and the power from the engine and the power from the second motor generator are combined by the high-speed planetary transmission to generate combined power on the high-speed side with a speed higher than the combined power on the low-speed side. Hereby, it is possible to obtain combined power with a large speed variation range. Since the low-speed planetary transmission portion, the high-speed planetary transmission portion, the first motor generator, and the second motor generator are positioned collectively in the vehicle-body up-down direction and in the vehicle-body width direction, it is possible to compactify the gear transmission portion such that the gear transmission portion does not expand so much in the vehicle-body up-down direction and in the vehicle-body width direction, and it is possible to drive the travel devices by shifting over the large speed variation range.

In a preferred embodiment of the present invention, it is preferable that the engine is in a front portion of the vehicle body, and the transmission case is behind the engine.

In this configuration, the load of the engine is applied to the front portion of the vehicle body, so that it is possible to achieve a hybrid work vehicle in a state where the weights of the vehicle body on the front side and on the rear side can be easily balanced even when a work device is connected to a rear portion of the vehicle body.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

First Preferred Embodiment

A preferred embodiment (a first preferred embodiment) as an example of the present invention will be described below with reference to the drawings.

Figure 1:
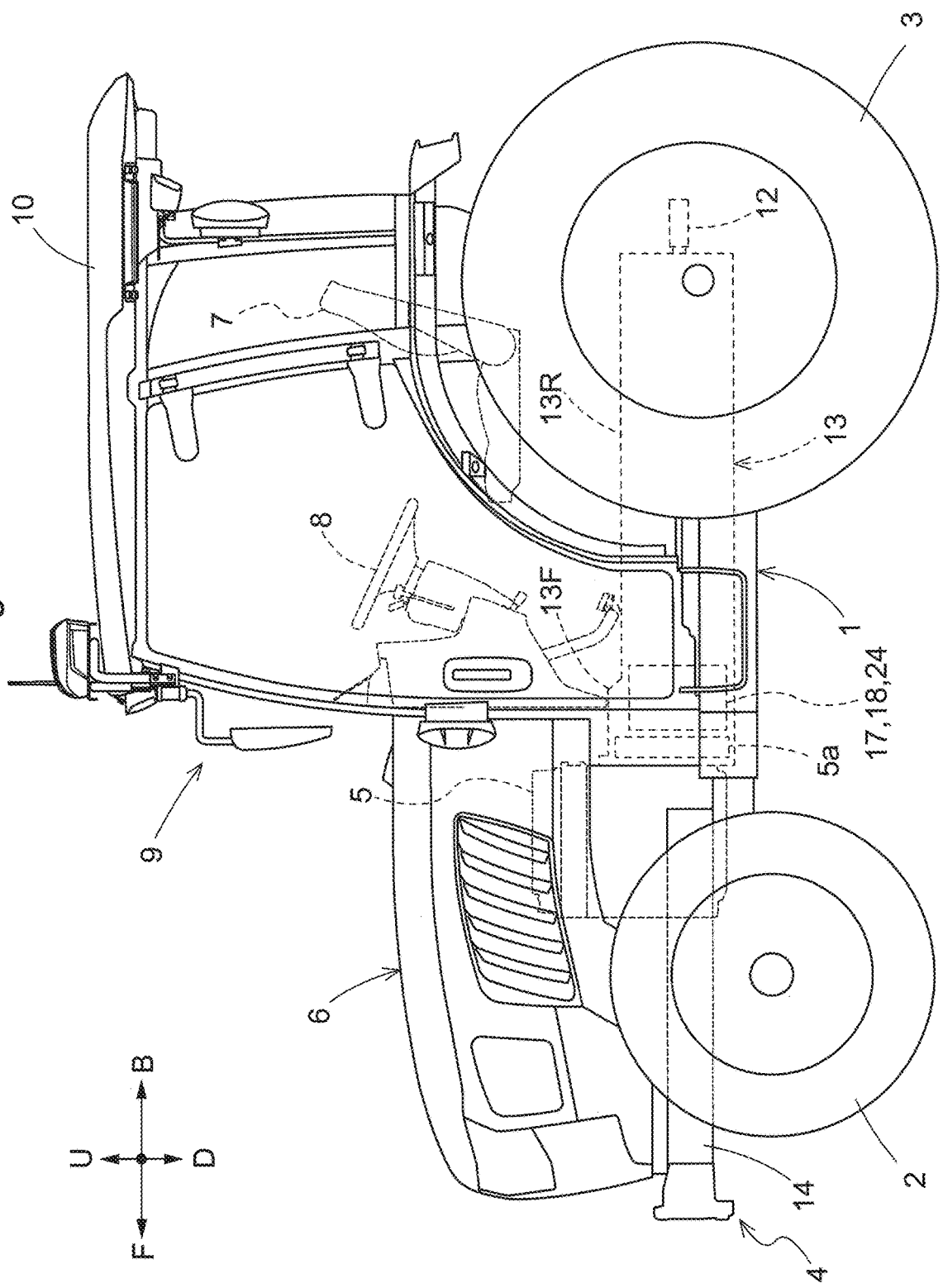
FIG. 1 is a view illustrating a first preferred embodiment of the present invention and is a side view illustrating the entire structure of a tractor.

Note that, in the following description, in terms of a traveling vehicle body of a tractor (an example of a "work vehicle"), a direction of an arrow F illustrated in FIG. 1 is referred to as a "vehicle-body front side," a direction of an arrow B is referred to as a "vehicle-body rear side," a direction of an arrow U is referred to as a "vehicle-body upper side," a direction of an arrow D is referred to as a "vehicle-body lower side," a direction of the front of the plane of paper is referred to as a "vehicle-body left side," and a direction of the back of the plane of paper is referred to as a "vehicle-body right side."

As illustrated in FIG. 1, a tractor includes a traveling vehicle body 4 including a vehicle body frame 1, a pair of right and left front wheels 2 provided in a steerable and drivable manner in a front portion of the vehicle body frame 1, and a pair of right and left rear wheels 3 provided in a drivable manner in a rear portion of the vehicle body frame 1. The traveling vehicle body 4 includes a front portion in which a motor portion 6 including an engine 5 is provided. The traveling vehicle body 4 includes a rear portion in which a driving portion 9 is provided, the driving portion 9 including a driver seat 7 and a steering wheel 8 by which the front wheels 2 are steered. The driving portion 9 includes a cabin 10 covering a cabin space. The rear portion of the traveling vehicle body 4 includes a link mechanism (not illustrated) via which a work device such as a rotary cultivating device (not illustrated) is connected in a vertically operable manner, and a power take-off shaft 12 to extract power from the engine 5 and transmit the power to the work device thus connected. The vehicle body frame 1 is defined by the engine 5, a transmission case 13 adjacently provided behind the engine 5, and a front frame 14 connected to a lower portion of the engine 5. In the present preferred embodiment, the front wheels 2 and the rear wheels 3 are provided, but as the travel devices, a crawler travel device or a device in combination with wheels and a mini crawler can be used.

Figure 2:
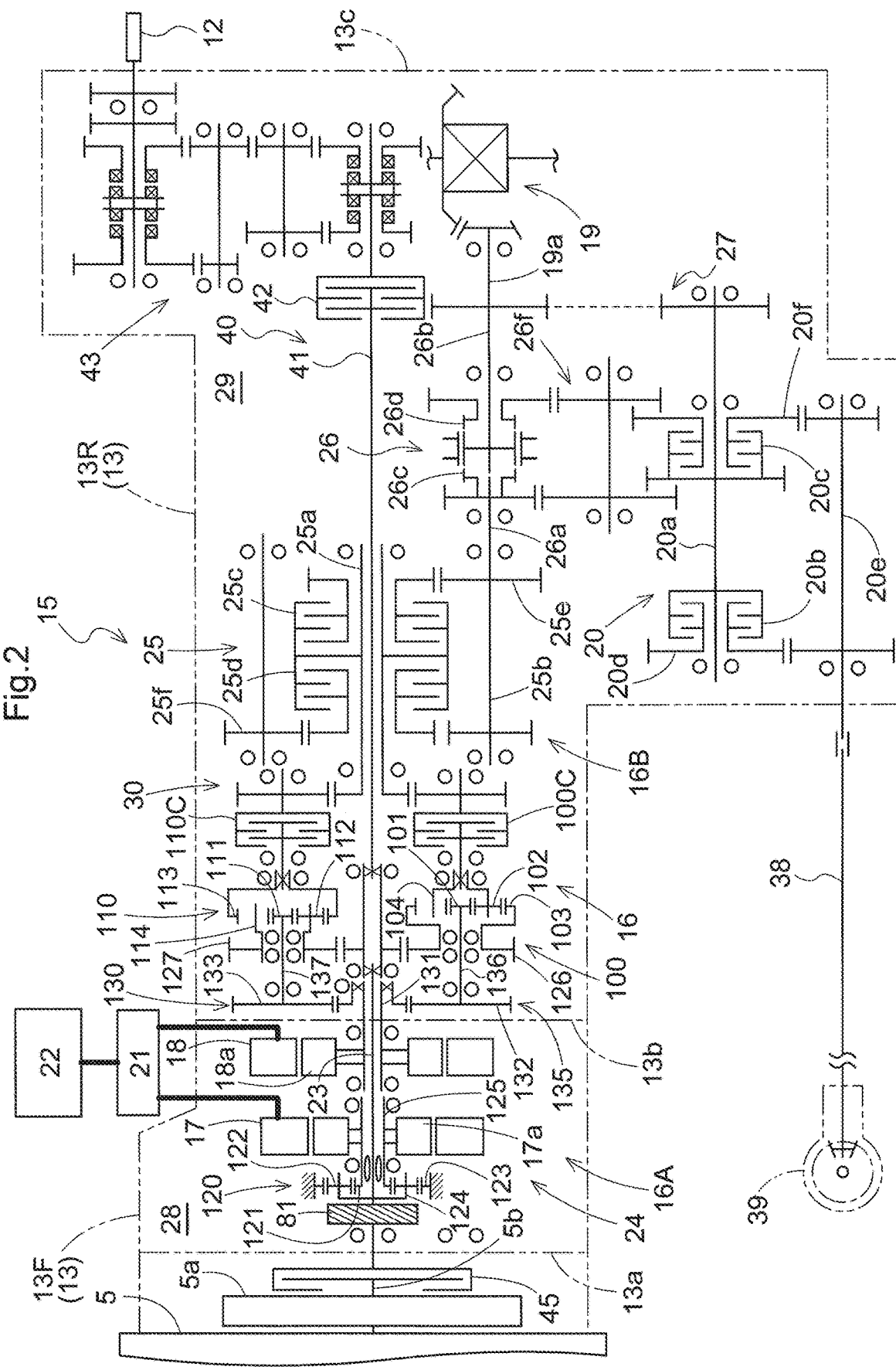
FIG. 2 is a view illustrating the first preferred embodiment of the present invention and is a schematic view of a traveling power transmission device.

A traveling power transmission device 15 to transmit power from the engine 5 to the front wheels 2 and the rear wheels 3 includes the transmission case 13 adjacently provided behind the engine 5, as illustrated in FIGS. 1, 2. The transmission case 13 is side by side with the engine 5 in a direction along a vehicle-body front-rear direction and extends along the vehicle-body front-rear direction. The engine 5 is provided in the front portion of the vehicle body, and the transmission case 13 is connected to a rear portion of the engine 5. As illustrated in FIG. 1, the transmission case 13 is connected to the engine 5 such that a flywheel housing portion 13F is provided in a front portion of the transmission case 13, and a front end of the flywheel housing portion 13F is connected to a rear end of the engine 5. The flywheel housing portion 13F covers a flywheel 5a (see FIG. 2) provided in the rear portion of the engine 5. The outside diameter of a largest diameter portion of the flywheel housing portion 13F is larger than the outside diameter of a portion 13R of the transmission case 13, the portion 13R being rearward of the flywheel housing portion 13F.

As illustrated in FIG. 2, in the transmission case 13, a hybrid transmission 16 is accommodated to vary the power from the engine 5 and output the power to the front wheels 2 and the rear wheels 3.

As illustrated in FIG. 2, the hybrid transmission 16 includes an input shaft 23 into which power from an output shaft 5b of the engine 5 is input, the input shaft 23 being provided in a front portion of the transmission case 13, an electric transmission portion 16A adjacently positioned behind the engine 5, and a gear transmission portion 16B positioned rearward of the electric transmission portion 16A. The axis of the input shaft 23 coincides with the axis of the output shaft 5b.

As illustrated in FIG. 2, the electric transmission portion 16A is accommodated in an electric transmission chamber 28 in the front portion of the transmission case 13. The gear transmission portion 16B is accommodated in a gear transmission chamber 29 in a rear portion of the transmission case 13. The electric transmission chamber 28 is defined by a peripheral wall of the transmission case 13, a front wall 13a provided inside a front end of the transmission case 13, and a partition wall 13b provided inside an intermediate portion of the transmission case 13. The gear transmission chamber 29 is defined by the peripheral wall of the transmission case 13, a rear wall 13c in a rear end of the transmission case 13, and the partition wall 13b. The electric transmission chamber 28 and the gear transmission chamber 29 are adjacent to each other across the partition wall 13b. The electric transmission chamber 28 and the gear transmission chamber 29 are separated from each other by the partition wall 13b such that the electric transmission chamber 28 and the gear transmission chamber 29 do not communicate with each other. The partition wall 13b includes a peripheral edge on an outer peripheral side, the peripheral edge being connected to the inside of the peripheral wall of the transmission case 13. The partition wall 13b includes a sealing member (not illustrated) closing a gap between the partition wall 13b and a rotating shaft 131 in a through-hole provided in the partition wall 13b such that the rotating shaft 131 extends through the through-hole. Thus, the electric transmission chamber 28 and the gear transmission chamber 29 can be separated from each other by the partition wall 13b.

As illustrated in FIG. 2, the electric transmission portion 16A is provided between the engine 5 and the gear transmission portion 16B. The electric transmission portion 16A is adjacently positioned behind the engine 5. The electric transmission portion 16A can be accommodated in a portion of the transmission case 13 in which a portion of the flywheel housing portion 13F having a large outside diameter is positioned.

As illustrated in FIG. 2, the electric transmission portion 16A includes a motor generator portion 24. The motor generator portion 24 includes two motor generators 17, 18. The two motor generators 17, 18 are connected to an inverter device 21, and the inverter device 21 is connected to a battery 22.

The two motor generators 17, 18 are positioned in the direction along the vehicle-body front-rear direction. A first motor generator 17 on the front side out of the two motor generators 17, 18 is on a side of a second motor generator 18 on which side the engine 5 is located on the rear side out of the two motor generators 17, 18. The second motor generator 18 is on a side of the first motor generator 17 on which side the gear transmission portion 16B is located. The rotation axis of the first motor generator 17, the rotation axis of the second motor generator 18, and the axis of the input shaft 23 of the transmission case 13 coincide with each other.

An input transmission mechanism 120 is on the side of the first motor generator 17 on which side the engine 5 is located. The input transmission mechanism 120 connects the first motor generator 17 to the input shaft 23 of the transmission case 13 to input the power from the input shaft 23 into the first motor generator 17.

More specifically, as illustrated in FIG. 2, the input transmission mechanism 120 includes a sun gear 121, a planetary gear 122, an internal gear 123, and a carrier 124. The sun gear 121 is connected to a rotor 17a of the first motor generator 17 in a state where the sun gear 121 rotates around its rotation axis coinciding with the axis of the input shaft 23. The sun gear 121 is connected to the rotor 17a via a rotating shaft 125. The carrier 124 is connected to the input shaft 23. The internal gear 123 is fixed to the transmission case 13.

The input transmission mechanism 120 is defined by a planetary gear mechanism, and the input transmission mechanism 120 increases the speed of the power transmitted from the engine 5 to the input shaft 23 and inputs the power into the rotor 17a of the first motor generator 17. In the present preferred embodiment, the input transmission mechanism 120 is defined by a planetary gear mechanism, but as the input transmission mechanism 120, a gear linkage mechanism other than the planetary gear mechanism is usable. Further, as the input transmission mechanism 120, a transmission mechanism to transmit the power from the input shaft 23 to the first motor generator 17 without increasing (changing) the speed of the power.

As illustrated in FIG. 2, the gear transmission portion 16B is provided on a side opposite to the side where the engine 5 is located, across the electric transmission portion 16A. The gear transmission portion 16B is adjacently positioned behind the electric transmission portion 16A.

As illustrated in FIG. 2, the gear transmission portion 16B includes a gear driving mechanism 30 without a motor generator. The gear driving mechanism 30 includes a low-speed planetary transmission portion 100, a low-speed clutch 100C, a high-speed planetary transmission portion 110, a high-speed clutch 110C, a forward-reverse switching device 25, a sub-transmission 26, a rear-wheel differential mechanism 19, a front-wheel transmission 20, and a gear linkage mechanism 27.

As illustrated in FIG. 2, the low-speed planetary transmission portion 100 includes a sun gear 101, a planetary gear 102, an internal gear 103, and a carrier 104. The internal gear 103 of the low-speed planetary transmission portion 100 is connected to the input shaft 23 via a first linkage mechanism 126. The high-speed planetary transmission portion 110 includes a sun gear 111, a planetary gear 112, an internal gear 113, and a carrier 114. The carrier 114 of the high-speed planetary transmission portion 110 is connected to the input shaft 23 via a second linkage mechanism 127.

An output transmission mechanism 130 is on the side of the second motor generator 18 on which side the gear transmission portion 16B is located. The output transmission mechanism 130 connects the second motor generator 18 to an input portion 135 located in a front portion of the gear transmission portion 16B such that the output transmission mechanism 130 transmits the driving force from the second motor generator 18 to the input portion 135.

More specifically, as illustrated in FIG. 2, the input portion 135 of the gear transmission portion 16B includes a first input shaft 136 connected to the sun gear 101 of the low-speed planetary transmission portion 100, and a second input shaft 137 connected to the sun gear 111 of the high-speed planetary transmission portion 110. The output transmission mechanism 130 includes a rotating shaft 131 connected to a rotor 18a of the second motor generator 18, a first gear linkage mechanism 132 connecting the rotating shaft 131 to the first input shaft 136, and a second gear linkage mechanism 133 connecting the rotating shaft 131 to the second input shaft 137. In the present preferred embodiment, the output transmission mechanism 130 of the second motor generator 18 is provided in the gear transmission chamber 29 but may be provided in the electric transmission chamber 28.

In the low-speed planetary transmission portion 100, the power from the input shaft 23 is transmitted to the internal gear 103 via the first linkage mechanism 126 to drive the internal gear 103, and the driving force from the second motor generator 18 is transmitted to the sun gear 101 via the output transmission mechanism 130 and the first input shaft 136 to drive the sun gear 101, so that the power from the engine 5 and the driving force from the second motor generator 18 are combined to generate combined power on a low-speed side. The combined power on the low-speed side is output from the carrier 104.

The low-speed clutch 100C is provided between an output portion of the low-speed planetary transmission portion 100 and the input shaft 25a of the forward-reverse switching device 25 and is configured such that, when the low-speed clutch 100C is switched to an engaged state (an ON state), the low-speed clutch 100C transmits the combined power on the low-speed side, output from the low-speed planetary transmission portion 100, to the forward-reverse switching device 25, and when the low-speed clutch 100C is switched to a disengaged state (an OFF state), the low-speed clutch 100C cuts off power transmission from the low-speed planetary transmission portion 100 to the forward-reverse switching device 25.

In the high-speed planetary transmission portion 110, the power from the input shaft 23 is transmitted to the carrier 114 via the second linkage mechanism 127 to drive the planetary gear 112, and the driving force from the second motor generator 18 is transmitted to the sun gear 111 via the output transmission mechanism 130 and the second input shaft 137 to drive the sun gear 111, so that the engine power from the input shaft 23 and the driving force from the second motor generator 18 are combined to generate combined power on a high-speed side. The combined power on the high-speed side is output from the internal gear 113. The combined power on the high-speed side is combined power with a speed higher than that of the combined power on the low-speed side that is generated by combining in the low-speed planetary transmission portion 100.

The high-speed clutch 110C is provided between an output portion of the high-speed planetary transmission portion 110 and the input shaft 25a of the forward-reverse switching device 25 and is configured such that, when the high-speed clutch 110C is switched to an engaged state (an ON state), the high-speed clutch 110C transmits the combined power on the high-speed side, output from the high-speed planetary transmission portion 110, to the forward-reverse switching device 25, and when the high-speed clutch 110C is switched to a disengaged state (an OFF state), the high-speed clutch 110C cuts off power transmission from the high-speed planetary transmission portion 110 to the forward-reverse switching device 25.

As illustrated in FIG. 2, the forward-reverse switching device 25 includes the input shaft 25a rearward of the low-speed planetary transmission portion 100 and the high-speed planetary transmission portion 110, and an output shaft 25b disposed in parallel with the input shaft 25a. The axis of the input shaft 25a coincides with the axis of the input shaft 23. The input shaft 25a is provided with a forward clutch 25c and a reverse clutch 25d. A forward gear mechanism 25e is provided over the forward clutch 25c and the output shaft 25b. A reverse gear mechanism 25f is provided over the reverse clutch 25d and the output shaft 25b.

In the forward-reverse switching device 25, the output from the low-speed clutch 100C and the output from the high-speed clutch 110C are input into the input shaft 25a. When the forward clutch 25c is engaged, the power from the input shaft 25a is switched to forward power by the forward gear mechanism 25e and the forward clutch 25c, transmitted to the output shaft 25*b*, and output from the output shaft 25*b*. When the reverse clutch 25*d* is engaged, the power of the input shaft 25*a* is switched to rearward power by the reverse gear mechanism 25*f* and the reverse clutch 25*d*, transmitted to the output shaft 25*b*, and output from the output shaft 25*b*.

As illustrated in FIG. 2, the sub-transmission 26 includes an input shaft 26*a* connected to the output shaft 25*b* of the forward-reverse switching device 25, and an output shaft 26*b* provided rearward of the input shaft 26*a*. The input shaft 26*a* and the output shaft 26*b* are coaxial. A high-speed clutch 26*c* is provided between a rear portion of the input shaft 26*a* and a front portion of the output shaft 26*b*. A low-speed gear mechanism 26*f* and a low-speed clutch 26*d* are provided over the input shaft 26*a* and a rear portion of the output shaft 26*b*.

In the sub-transmission 26, the output from the forward-reverse switching device 25 is input into the input shaft 26*a*. When the high-speed clutch 26*c* is engaged, the power from the input shaft 26*a* is transmitted to the output shaft 26*b* via the high-speed clutch 26*c* without being changed in speed, and power on a high-speed side is output from the output shaft 26*b*. When the low-speed clutch 26*d* is engaged, the power from the input shaft 26*a* is changed in speed to power on a low-speed side by the low-speed gear mechanism 26*f* and the low-speed clutch 26*d*, and the power on the low-speed side is transmitted to the output shaft 26*b* and then output from the output shaft 26*b*. The power on the low-speed side has a speed lower than that of the power on the high-speed side to be output when the high-speed clutch 26*c* is engaged.

As illustrated in FIG. 2, the rear-wheel differential mechanism 19 includes an input shaft 19*a* into which the output from the sub-transmission 26 is input. The input shaft 19*a* is connected to a rear portion of the output shaft 26*b* of the sub-transmission 26. The gear linkage mechanism 27 is provided over the output shaft 26*b* of the sub-transmission 26 and an input shaft 20*a* of the front-wheel transmission 20 to transmit the power from the output shaft 26*b* of the sub-transmission 26 to the input shaft 20*a* of the front-wheel transmission 20.

As illustrated in FIG. 2, the front-wheel transmission 20 includes the input shaft 20*a* connected to the gear linkage mechanism 27 and an output shaft 20*e* disposed in parallel with the input shaft 20*a*. The input shaft 20*a* is provided with a constant speed clutch 20*b* and a speed increasing clutch 20*c*. A constant speed gear mechanism 20*d* is provided over the constant speed clutch 20*b* and the output shaft 20*e*. A speed increasing gear mechanism 20*f* is provided over the speed increasing clutch 20*c* and the output shaft 20*e*.

In the front-wheel transmission 20, the output from the sub-transmission 26 is transmitted to the input shaft 20*a* via the gear linkage mechanism 27. When the constant speed clutch 20*b* is engaged, the power from the input shaft 20*a* is changed in speed to constant speed power by the constant speed clutch 20*b* and the constant speed gear mechanism 20*d*, and the constant speed power is transmitted to the output shaft 20*e* and then output from the output shaft 20*e*. The constant speed power is power by which the front wheels 2 and the rear wheels 3 are driven at the same speed. When the speed increasing clutch 20*c* is engaged, the power from the input shaft 20*a* is changed in speed to speed-increasing power by the speed increasing clutch 20*c* and the speed increasing gear mechanism 20*f*, and the speed-increasing power is transmitted to the output shaft 20*e* and then output from the output shaft 20*e*. The speed-increasing power is power by which the front wheels 2 are driven at a speed higher than that of the rear wheels 3. The power from the output shaft 20*e* of the front-wheel transmission 20 is transmitted to a front-wheel differential mechanism 39 via a rotating shaft 38.

In the traveling power transmission device 15, when the front wheels 2 and the rear wheels 3 are to be driven, the power from the engine 5 and the driving force from the second motor generator 18 are transmitted to the front wheels 2 and the rear wheels 3.

That is, the power from the input shaft 23 is transmitted to the internal gear 103 of the low-speed planetary transmission portion 100 via the first linkage mechanism 126, and the driving force from the second motor generator 18 is transmitted to the sun gear 101 of the low-speed planetary transmission portion 100 via the output transmission mechanism 130 and the first input shaft 136, so that the power (engine power) from the engine 5 is combined with the driving force (motor power) from the second motor generator 18 into combined power on the low-speed side by the low-speed planetary transmission portion 100. The combined power on the low-speed side is output to the low-speed clutch 100C. The power from the input shaft 23 is transmitted to the carrier 114 of the high-speed planetary transmission portion 110 via the second linkage mechanism 127, and the driving force from the second motor generator 18 is transmitted to the sun gear 111 of the high-speed planetary transmission portion 110 via the output transmission mechanism 130 and the second input shaft 137, so that the power (engine power) from the engine 5 is combined with the driving force (motor power) from the second motor generator 18 into combined power on the high-speed side by the high-speed planetary transmission portion 110. The combined power on the high-speed side is output to the high-speed clutch 110C. When the low-speed clutch 100C is switched to an engaged state (an ON state) and the high-speed clutch 110C is switched to a disengaged state (an OFF state), the combined power on the low-speed side from the low-speed clutch 100C is transmitted to the sub-transmission 26 via the forward-reverse switching device 25 and then transmitted from the sub-transmission 26 to the rear-wheel differential mechanism 19 and the front-wheel transmission 20.

When the low-speed clutch 100C is switched to the disengaged state (the OFF state) and the high-speed clutch 110C is switched to the engaged state (the ON state), the combined power on the high-speed side from the high-speed clutch 110C is transmitted to the sub-transmission 26 via the forward-reverse switching device 25 and transmitted from the sub-transmission 26 to the rear-wheel differential mechanism 19 and the front-wheel transmission 20 via the gear linkage mechanism 27.

The second motor generator 18 mainly works as an electric machine to drive the front wheels 2 and the rear wheels 3, but the second motor generator 18 works as a generator at the time of deceleration.

In the traveling power transmission device 15, when the front wheels 2 and the rear wheels 3 are to be driven, the power transmitted from the engine 5 to the input shaft 23 is input into the first motor generator 17 via the input transmission mechanism 120, so that the first motor generator 17 is driven to generate electric power. The electric power thus generated can be supplied to the second motor generator 18 for driving. The supply of the electric power to the second motor generator 18 is performed such that the electric power thus generated is charged in the battery 22 and is supplied to the second motor generator 18 via the battery 22, or the electric power thus generated is not charged in the battery 22 and is directly supplied to the second motor generator 18 without the battery 22.

As illustrated in FIG. 2, a clutch 45 is provided over the output shaft 5*b* and the input shaft 23. The clutch 45 is changeable between an engaged state (an ON state) and a disengaged state (an OFF state) by a hydraulic electromagnetic valve or the like. When the clutch 45 is switched to the engaged state, the power from the engine 5 is transmitted to the electric transmission portion 16A and the gear transmission portion 16B, so that the hybrid transmission 16 is switched to a hybrid mode in which the front wheels 2 and the rear wheels 3 are driven by the power from the engine 5 and the driving force from the second motor generator 18, and electric power is generate by the first motor generator 17. When the clutch 45 is switched to the disengaged state, power transmission from the engine 5 to the electric transmission portion 16A and the gear transmission portion 16B is cut off, so that the hybrid transmission 16 is switched to an electrically-driven mode in which the front wheels 2 and the rear wheels 3 are driven only by the driving force from the second motor generator 18. As the clutch 45, a dry clutch can be used.

As illustrated in FIG. 1, the power take-off shaft 12 is supported by the rear portion of the transmission case 13. As illustrated in FIG. 2, in the transmission case 13, a work power transmission device 40 to transmit the power from the engine 5 to the power take-off shaft 12 is accommodated.

As illustrated in FIG. 2, the work power transmission device 40 is provided behind the input shaft 23 in a state where the work power transmission device 40 extends along the vehicle-body front-rear direction. The work power transmission device 40 includes a rotating shaft 41 including a front portion connected to the input shaft 23, a work clutch 42 connected to a rear portion of the rotating shaft 41, and a power take-off shaft transmission 43 to transmit the output from the work clutch 42 to the power take-off shaft 12 by changing the speed of the output. The axis of the rotating shaft 41 coincides with the axis of the input shaft 23. The input shaft 23 and the rotating shaft 41 are connected in an interlocking manner directly or via a joint.

In the work power transmission device 40, the power from the input shaft 23 is transmitted to the rotating shaft 41 and is transmitted from the rotating shaft 41 to the power take-off shaft 12 via the work clutch 42 and the power take-off shaft transmission 43. The work clutch 42 switches between an engaged state where the power from the engine 5 is transmitted to the power take-off shaft 12 and a disengaged state where power transmission from the engine 5 to the power take-off shaft 12 is cut off.

Modifications of First Preferred Embodiment

The above preferred embodiment deals with an example in which the input transmission mechanism 120 is provided, but the first motor generator 17 may be directly connected to the input shaft 23 without the input transmission mechanism 120.

The above preferred embodiment deals with an example in which the input transmission mechanism 120 is configured to increase the power from the input shaft 23 and transmit the power to the first motor generator 17. However, the present invention is not limited to this. As the input transmission mechanism 120, an input transmission mechanism to increase the power from the input shaft 23 and transmit the power to the first motor generator 17 without changing the power.

The above preferred embodiment deals with an example in which the low-speed planetary transmission portion 100 and the high-speed planetary transmission portion 110 are provided in the gear driving mechanism 30. However, the present invention is not limited to this. A transmission mechanism to change the speed by changing a shift gear, a transmission mechanism that employs a stepless speed variator, or the like may be used.

The above preferred embodiment deals with an example in which the engine 5 is provided in the front portion of the vehicle body, and the transmission case 13 is adjacently provided behind the engine 5. However, the engine 5 may be provided in the rear portion of the vehicle body, and the transmission case 13 may be adjacently provided in front of the engine 5.

The above preferred embodiment deals with an example in which the engine 5 is connected to the transmission case 13. However, the engine 5 and the transmission case 13 may be spaced from each other without being connected to each other.

The above preferred embodiment deals with an example in which the front wheels 2 and the rear wheels 3 are provided as travel devices. However, the present invention is not limited to this. As the travel devices, a crawler travel device or a device in combination with wheels and a mini crawler may be used.

The above preferred embodiment deals with an example in which the power take-off shaft 12 is provided, but the power take-off shaft 12 may not be provided.

Second Preferred Embodiment

A second preferred embodiment as an example of the present invention will be described below with reference to the drawings.

Note that, in the following description, in terms of a traveling vehicle body of a tractor (an example of a "work vehicle"), a direction of an arrow F illustrated in FIG. 3 and so on is referred to as a "vehicle-body front side," a direction of an arrow B is referred to as a "vehicle-body rear side," a direction of an arrow U is referred to as a "vehicle-body upper side," a direction of an arrow D is referred to as a "vehicle-body lower side," a direction of an arrow L is referred to as a "vehicle-body left side," and a direction of an arrow R is referred to as a "vehicle-body right side."

Figure 3:
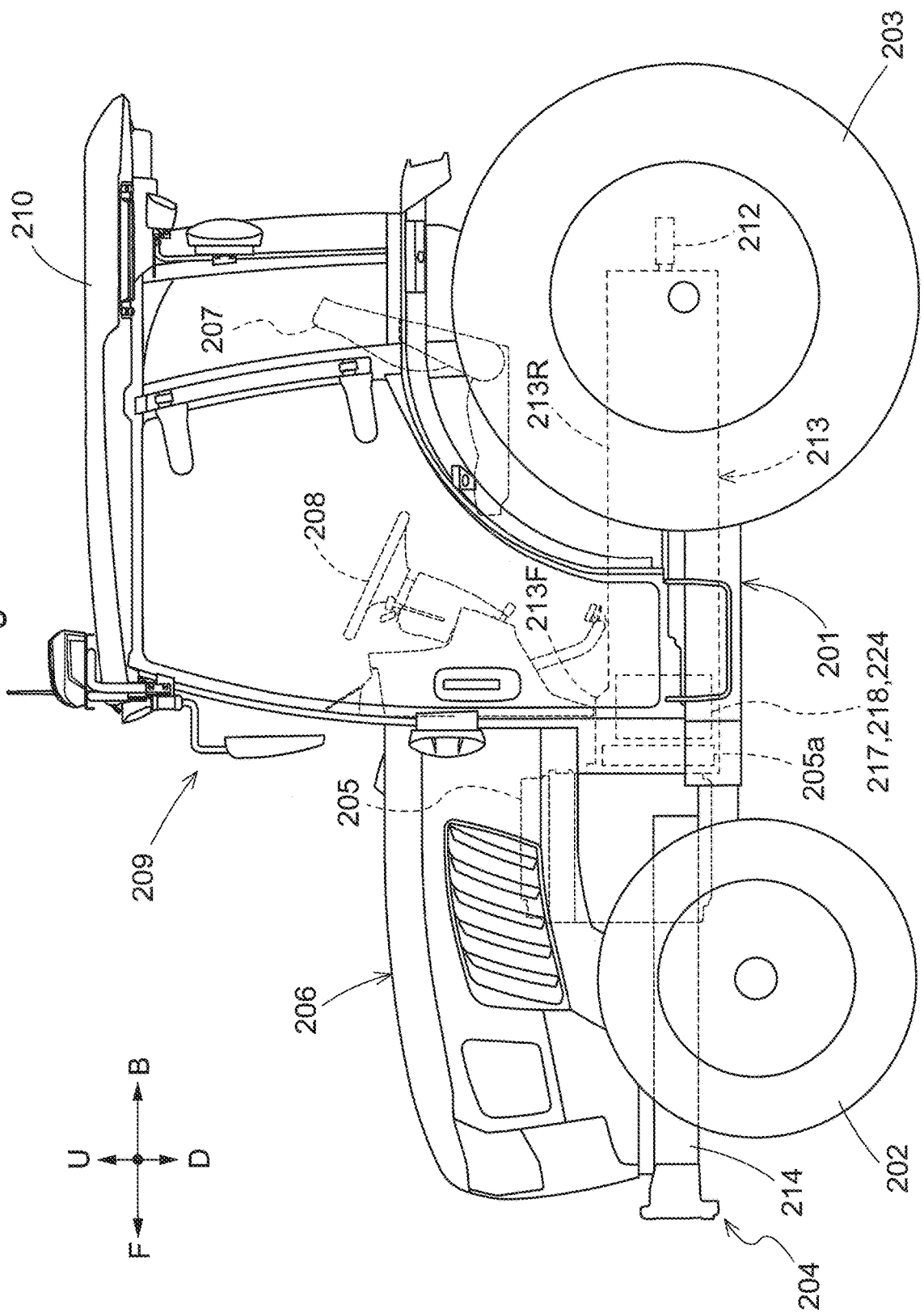
FIG. 3 is a view illustrating a second preferred embodiment of the present invention and is a side view illustrating the entire structure of a tractor.

As illustrated in FIG. 3, the tractor includes a traveling vehicle body 204 including a vehicle body frame 201, a pair of right and left front wheels 202 provided in a front portion of the vehicle body frame 201 in a steerable and drivable manner, and a pair of right and left rear wheels 203 provided in a rear portion of the vehicle body frame 201 in a drivable manner. The traveling vehicle body 204 includes a front portion in which a motor portion 206 including an engine 205 is provided. The traveling vehicle body 204 includes a rear portion in which a driving portion 209 is provided, the driving portion 209 including a driver seat 207 and a steering wheel 208 by which the front wheels 202 are steered. The driving portion 209 includes a cabin 210 covering a cabin space. The rear portion of the traveling vehicle body 204 includes a link mechanism (not illustrated) via which a work device such as a rotary cultivating device (not illustrated) is connected in a vertically operable manner, and a power take-off shaft 212 to extract power from the engine 205 and transmit the power to the work device thus connected. The vehicle body frame 201 is defined by the engine 205, a transmission case 213 adjacently provided behind the engine 205, and a front frame 214 connected to a lower portion of the engine 205. In the present preferred embodiment, the front wheels 202 and the rear wheels 203 are provided, but as the travel devices, a crawler travel device or a device in combination with wheels and a mini crawler can be used.

Figure 4:
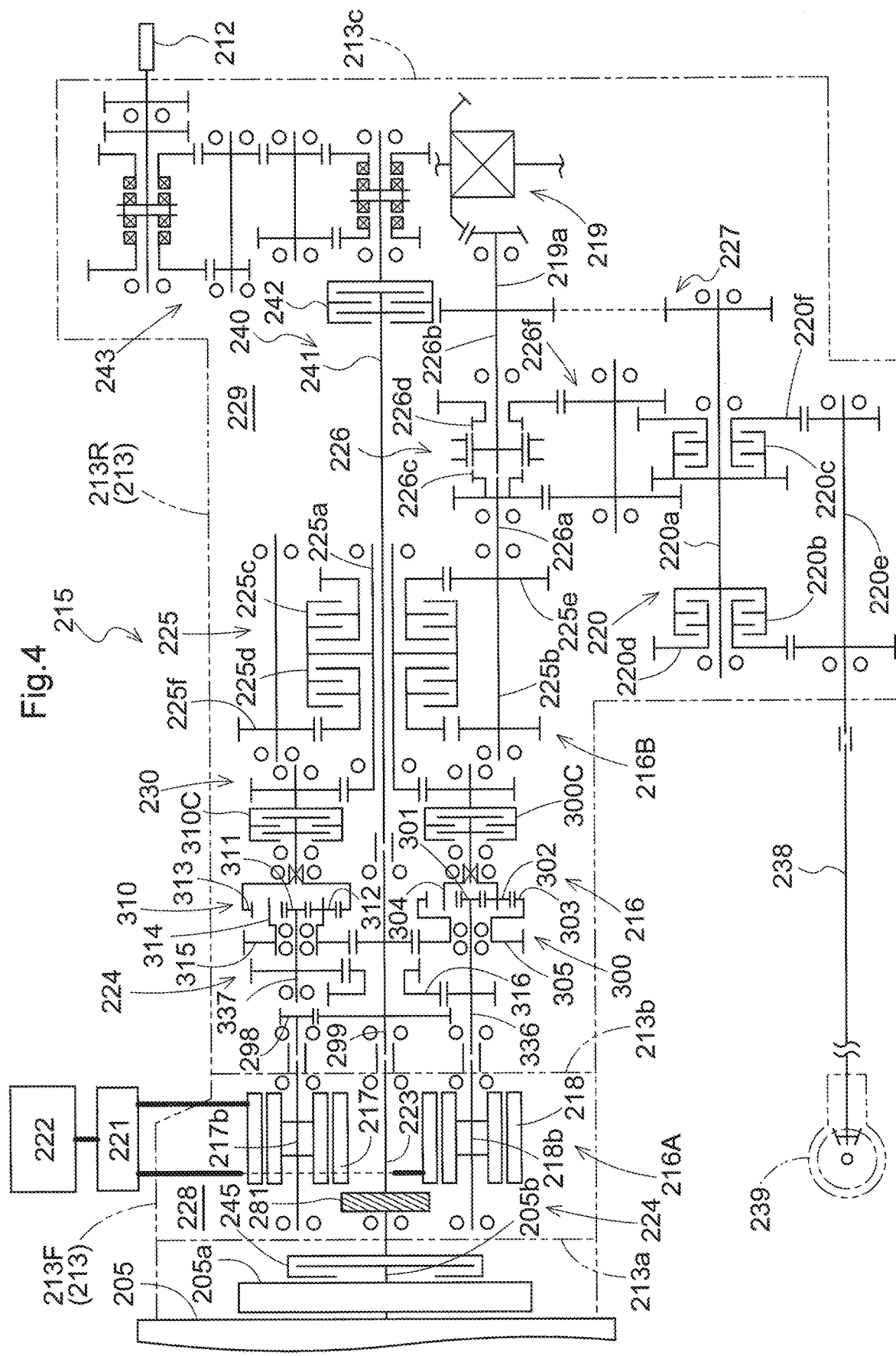
FIG. 4 is a view illustrating the second preferred embodiment of the present invention and is a schematic view of a traveling power transmission device.

A traveling power transmission device 215 to transmit the power from the engine 205 to the front wheels 202 and the rear wheels 203 includes the transmission case 213 adjacently provided behind the engine 205, as illustrated in FIGS. 3, 4. The transmission case 213 is side by side with the engine 205 in the direction along the vehicle-body front-rear direction and extends along the vehicle-body front-rear direction. The engine 205 is provided in the front portion of the vehicle body, and the transmission case 213 is connected to a rear portion of the engine 205. As illustrated in FIG. 3, the transmission case 213 is connected to the engine 205 such that a flywheel housing portion 213F is provided in a front portion of the transmission case 213, and a front end of the flywheel housing portion 213F is connected to a rear end of the engine 205. The flywheel housing portion 213F covers a flywheel 205a (see FIG. 4) provided in the rear portion of the engine 205. The outside diameter of a largest diameter portion of the flywheel housing portion 213F is larger than the outside diameter of a portion 213R of the transmission case 213, the portion 213R being rearward of the flywheel housing portion 213F.

As illustrated in FIG. 4, in the transmission case 213, a hybrid transmission 216 is accommodated, the hybrid transmission 216 being configured to output the power from the engine 205 toward the front wheels 202 and the rear wheels 203 by changing the speed of the power.

As illustrated in FIG. 4, the hybrid transmission 216 includes an input shaft 223 into which power from an output shaft 205b of the engine 205 is input, the input shaft 223 being provided in the front portion of the transmission case 213, an electric transmission portion 216A adjacently located behind the engine 205, and a gear transmission portion 216B located rearward of the electric transmission portion 216A. The axis of the input shaft 223 coincides with the axis of the output shaft 205b.

As illustrated in FIG. 4, the electric transmission portion 216A is accommodated in an electric transmission chamber 228 in the front portion of the transmission case 213. The gear transmission portion 216B is accommodated in a gear transmission chamber 229 in a rear portion of the transmission case 213. The electric transmission chamber 228 is defined by a peripheral wall of the transmission case 213, a front wall 213a provided inside a front end of the transmission case 213, and a partition wall 213b provided inside an intermediate part of the transmission case 213. The gear transmission chamber 229 is formed by the peripheral wall of the transmission case 213, a rear wall 213c located in a rear end of the transmission case 213, and the partition wall 213b. The electric transmission chamber 228 and the gear transmission chamber 229 are adjacent to each other across the partition wall 213b. The electric transmission chamber 228 and the gear transmission chamber 229 are separated from each other by the partition wall 213b such that the electric transmission chamber 228 and the gear transmission chamber 229 do not communicate with each other. The partition wall 213b has a peripheral edge on an outer peripheral side, the peripheral edge being connected to the inside of the peripheral wall of the transmission case 213. The partition wall 213b includes a sealing member (not illustrated) closing a gap between the partition wall 213b and the input shaft 223 or the like in a through-hole provided in the partition wall 213b such that the input shaft 223 or the like extends through the through-hole. Thus, the electric transmission chamber 228 and the gear transmission chamber 229 can be separated from each other by the partition wall 213b.

As illustrated in FIG. 4, the electric transmission portion 216A is provided between the engine 205 and the gear transmission portion 216B. The electric transmission portion 216A is adjacently located behind the engine 205. The electric transmission portion 216A can be accommodated in a portion of the transmission case 213 in which a portion of the flywheel housing portion 213F with a large outside diameter is located.

As illustrated in FIG. 4, the electric transmission portion 216A includes a motor generator portion 224. The motor generator portion 224 includes two motor generators 217, 218. The two motor generators 217, 218 are connected to an inverter device 221, and the inverter device 221 is connected to a battery 222.

Figure 5:
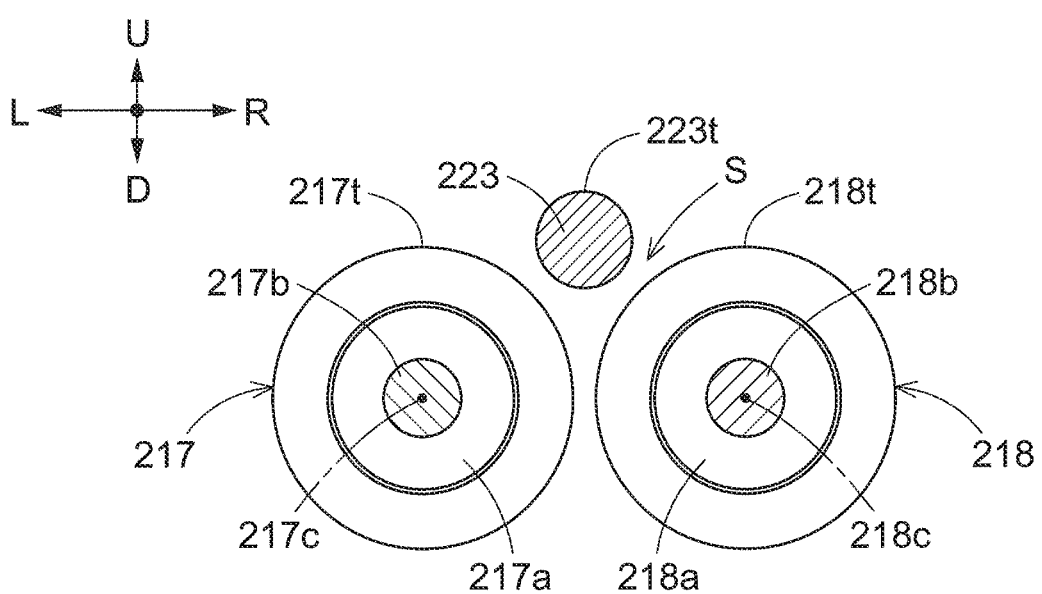
FIG. 5 is a view illustrating the second preferred embodiment of the present invention and is a front view illustrating the arrangement of motor generators.

The motor generator 217 as one of the two motor generators 217, 218 is referred to as a first motor generator 217, and the motor generator 218 as the other one of the two motor generators 217, 218 is referred to as a second motor generator 218. The first motor generator 217 and the second motor generator 218 are provided in a state where a first rotation axis 217c of the first motor generator 217 and a second rotation axis 218c of the second motor generator 218 extend along the vehicle-body front-rear direction, and the first rotation axis 217c and the second rotation axis 218c are parallel or substantially parallel to each other. In the present preferred embodiment, as illustrated in FIG. 5, the first motor generator 217 and the second motor generator 218 are provided in a state where the first rotation axis 217c and the second rotation axis 218c are parallel or substantially parallel to each other in a direction along a vehicle-body width direction. The first motor generator 217 and the second motor generator 218 are arranged in the direction along the vehicle-body width direction. As the first motor generator 217 and the second motor generator 218, motor generators having a long length in the direction along the vehicle-body front-rear direction can be used, in comparison with a case where two motor generators are positioned in the direction along the vehicle-body front-rear direction. In the present preferred embodiment, the outside diameter of the first motor generator 217 and the outside diameter of the second motor generator 218 are set to the same diameter.

The input shaft 223 of the transmission case 213 is provided to extend in the vehicle-body front-rear direction between the first motor generator 217 and the second motor generator 218. In the present preferred embodiment, as illustrated in FIG. 5, the input shaft 223 extends in the front-rear direction above the first rotation axis 217c of the first motor generator 217 and the second rotation axis 218c of the second motor generator 218. A gap S expanding upward in a view from a direction along the first rotation axis 217c is defined between a portion of the first motor generator 217 above the first rotation axis 217c and a portion of the second motor generator 218 above the second rotation axis 218c. The input shaft 223 extends through the gap S. The input shaft 223 includes an upper end 223t located above an upper end 217t of the first motor generator 217 and above an upper end 218t of the second motor generator 218. The input shaft 223 extends in an upper portion of the gap S.

As illustrated in FIG. 4, the gear transmission portion 216B is provided on a side opposite to a side where the engine 205 is located, across the electric transmission portion 216A. The gear transmission portion 216B is adjacently located behind the electric transmission portion 216A.

As illustrated in FIG. 4, the gear transmission portion 216B includes a gear driving mechanism 230 without a motor generator. The gear driving mechanism 230 includes a driving mechanism input shaft 299, a gear driving mechanism 298, a low-speed planetary transmission portion 300, a low-speed clutch 300C, a high-speed planetary transmission portion 310, a high-speed clutch 310C, a forward-reverse switching device 225, a sub-transmission 226, a rear-wheel differential mechanism 219, a front-wheel transmission 220, and a gear linkage mechanism 227.

The driving mechanism input shaft 299 is provided behind the input shaft 223 of the transmission case 213 in a state where the driving mechanism input shaft 299 is coaxial with the input shaft 223. The driving mechanism input shaft 299 is connected to the input shaft 223, so that the power from the input shaft 223 is transmitted to the driving mechanism input shaft 299. The gear driving mechanism 298 is provided over the driving mechanism input shaft 299 and a rotor support shaft 217b of the first motor generator 217 to transmit the power from the input shaft 223 to the first motor generator 217.

As illustrated in FIG. 4, the low-speed planetary transmission portion 300 includes a sun gear 301, a planetary gear 302, an internal gear 303, and a carrier 304. The low-speed planetary transmission portion 300 is provided behind the second motor generator 218 in a state where the rotation axis of the sun gear 301 coincides with a rotor support shaft 218b (the second rotation axis 218c) of the second motor generator 218. The internal gear 303 is connected to the driving mechanism input shaft 299 via a gear linkage mechanism 305. The sun gear 301 includes a first input shaft 336, and the first input shaft 336 is connected to the rotor support shaft 218b of the second motor generator 218.

In the low-speed planetary transmission portion 300, the power from the input shaft 223 is transmitted to the internal gear 303 to drive the internal gear 303, and the driving force from the second motor generator 218 is transmitted to the sun gear 301 to drive the sun gear 301, so that the power from the engine 205 and the driving force from the second motor generator 218 are combined to generate combined power on the low-speed side. The combined power on the low-speed side is output from the carrier 304.

The low-speed clutch 300C is provided between an output portion of the low-speed planetary transmission portion 300 and an input shaft 225a of the forward-reverse switching device 225 and is configured such that, when the low-speed clutch 300C is switched to an engaged state (an ON state), the low-speed clutch 300C transmits the combined power on the low-speed side, output from the low-speed planetary transmission portion 300, to the forward-reverse switching device 225, and when the low-speed clutch 300C is switched to a disengaged state (an OFF state), the low-speed clutch 300C cuts off power transmission from the low-speed planetary transmission portion 300 to the forward-reverse switching device 225.

As illustrated in FIG. 4, the high-speed planetary transmission portion 310 includes a sun gear 311, a planetary gear 312, an internal gear 313, and a carrier 314. The high-speed planetary transmission portion 310 is provided behind the first motor generator 217 in a state where the rotation axis of the sun gear 311 coincides with the rotor support shaft 217b (the first rotation axis) of the first motor generator 217. The carrier 314 is connected to the driving mechanism input shaft 299 via a gear linkage mechanism 315. The sun gear 311 includes a second input shaft 337, and the second input shaft 337 is connected to the rotor support shaft 218b of the second motor generator 218 via a gear linkage mechanism 316 and the first input shaft 336.

In the high-speed planetary transmission portion 310, the power from the input shaft 223 is transmitted to the carrier 314 to drive the planetary gear 312, and the driving force from the second motor generator 218 is transmitted to the sun gear 311 to drive the sun gear 311, so that the engine power from the input shaft 223 and the driving force from the second motor generator 218 are combined to generate combined power on the high-speed side. The combined power on the high-speed side is output from the internal gear 313. The combined power on the high-speed side is combined power with a speed higher than that of the combined power on the low-speed side that is generated by combining in the low-speed planetary transmission portion 300.

The high-speed clutch 310C is provided between an output portion of the high-speed planetary transmission portion 310 and the input shaft 225a of the forward-reverse switching device 225 and is configured such that, when the high-speed clutch 310C is switched to an engaged state (an ON state), the high-speed clutch 310C transmits the combined power on the high-speed side, output from the high-speed planetary transmission portion 310, to the forward-reverse switching device 225, and when the high-speed clutch 310C is switched to a disengaged state (an OFF state), the high-speed clutch 310C cuts off power transmission from the high-speed planetary transmission portion 310 to the forward-reverse switching device 225.

The present preferred embodiment includes a structural configuration in which the rotation axis of the sun gear 301 as the rotation axis of the low-speed planetary transmission portion 300 coincides with the second rotation axis 218c of the second motor generator 218, and the rotation axis of the sun gear 311 as the rotation axis of the high-speed planetary transmission portion 310 coincides with the first rotation axis 217c of the first motor generator 217. Instead of this configuration, an arrangement configuration in which the rotation axis of the sun gear 301 as the rotation axis of the low-speed planetary transmission portion 300 coincides with the first rotation axis 217c of the first motor generator 217, and the rotation axis of the sun gear 311 as the rotation axis of the high-speed planetary transmission portion 310 coincides with the second rotation axis 218c of the second motor generator 218 is usable.

As illustrated in FIG. 4, the forward-reverse switching device 225 includes the input shaft 225a located rearward of the driving mechanism input shaft 299, and an output shaft 225b that is parallel or substantially parallel to the input shaft 225a. The input shaft 225a and the driving mechanism input shaft 299 are coaxial. The input shaft 225a is provided with a forward clutch 225c and a reverse clutch 225d. A forward gear mechanism 225e is provided over the forward clutch 225c and the output shaft 225b. A reverse gear mechanism 225f is provided over the reverse clutch 225d and the output shaft 225b.

In the forward-reverse switching device 225, the output from the low-speed clutch 300C and the output from the high-speed clutch 310C are input into the input shaft 225a. When the forward clutch 225c is engaged, the power from the input shaft 225a is switched to forward power by the forward gear mechanism 225e and the forward clutch 225c, transmitted to the output shaft 225b, and output from the output shaft 225b. When the reverse clutch 225d is engaged, the power from the input shaft 225a is switched to rearward power by the reverse gear mechanism 225f and the reverse clutch 225d, transmitted to the output shaft 225b, and output from the output shaft 225b.

As illustrated in FIG. 4, the sub-transmission 226 includes an input shaft 226a connected to the output shaft 225b of the forward-reverse switching device 225, and an output shaft 226b provided rearward of the input shaft 226a. The input shaft 226a and the output shaft 226b are coaxial. A high-speed clutch 226c is provided between a rear portion of the input shaft 226a and a front portion of the output shaft 226b. A low-speed gear mechanism 226f and a low-speed clutch 226d are provided over the input shaft 226a and a rear portion of the output shaft 226b.

In the sub-transmission 226, the output from the forward-reverse switching device 225 is input into the input shaft 226a. When the high-speed clutch 226c is engaged, the power from the input shaft 226a is transmitted to the output shaft 226b via the high-speed clutch 226c without being changed in speed, and power on the high-speed side is output from the output shaft 226b. When the low-speed clutch 226d is engaged, the power from the input shaft 226a is changed in speed to power on the low-speed side by the low-speed gear mechanism 226f and the low-speed clutch 226d, and the power on the low-speed side is transmitted to the output shaft 226b and then output from the output shaft 226b. The power on the low-speed side has a speed lower than that of the power on the high-speed side to be output when the high-speed clutch 226c is engaged.

As illustrated in FIG. 4, the rear-wheel differential mechanism 219 includes an input shaft 219a into which the output from the sub-transmission 226 is input. The input shaft 219a is connected to a rear portion of the output shaft 226b of the sub-transmission 226. The gear linkage mechanism 227 is provided over the output shaft 226b of the sub-transmission 226 and an input shaft 220a of the front-wheel transmission 220 to transmit the power from the output shaft 226b of the sub-transmission 226 to the input shaft 220a of the front-wheel transmission 220.

As illustrated in FIG. 4, the front-wheel transmission 220 includes the input shaft 220a connected to the gear linkage mechanism 227 and an output shaft 220e parallel or substantially parallel to the input shaft 220a. The input shaft 220a is provided with a constant speed clutch 220b and a speed increasing clutch 220c. A constant speed gear mechanism 220d is provided over the constant speed clutch 220b and the output shaft 220e. A speed increasing gear mechanism 220f is provided over the speed increasing clutch 220c and the output shaft 220e.

In the front-wheel transmission 220, the output from the sub-transmission 226 is transmitted to the input shaft 220a via the gear linkage mechanism 227. When the constant speed clutch 220b is engaged, the power from the input shaft 220a is changed in speed to constant speed power by the constant speed clutch 220b and the constant speed gear mechanism 220d, and the constant speed power is transmitted to the output shaft 220e and then output from the output shaft 220e. The constant speed power is power by which the front wheels 202 and the rear wheels 203 are driven at the same speed. When the speed increasing clutch 220c is engaged, the power from the input shaft 220a is changed in speed to speed-increasing power by the speed increasing clutch 220c and the speed increasing gear mechanism 220f, and the speed-increasing power is transmitted to the output shaft 220e and then output from the output shaft 220e. The speed-increasing power is power by which the front wheels 202 are driven at a speed higher than that of the rear wheels 203. The power from the output shaft 220e of the front-wheel transmission 220 is transmitted to a front-wheel differential mechanism 239 via a rotating shaft 238.

In the traveling power transmission device 215, when the front wheels 202 and the rear wheels 203 are to be driven, the power from the engine 205 and the driving force from the second motor generator 218 are transmitted to the front wheels 202 and the rear wheels 203.

That is, the power (engine power) transmitted from the engine 205 to the input shaft 223 is combined with the driving force (motor power) from the second motor generator 218 into combined power on the low-speed side by the low-speed planetary transmission portion 300. The power (engine power) transmitted from the engine 205 to the input shaft 223 is combined with the driving force (motor power) from the second motor generator 218 into combined power on the high-speed side by the high-speed planetary transmission portion 310. When the low-speed clutch 300C is switched to the engaged state and the high-speed clutch 310C is switched to the disengaged state, the combined power on the low-speed side from the low-speed planetary transmission portion 300 is transmitted to the input shaft 225a of the forward-reverse switching device 225 and then transmitted from the output shaft 225b of the forward-reverse switching device 225 to the sub-transmission 226. Then, the combined power is transmitted from the sub-transmission 226 to the rear-wheel differential mechanism 219 and the front-wheel transmission 220 via the gear linkage mechanism 227. When the high-speed clutch 310C is switched to the engaged state and the low-speed clutch 300C is switched to the disengaged state, the combined power on the high-speed side from the high-speed planetary transmission portion 310 is transmitted to the input shaft 225a of the forward-reverse switching device 225 and then transmitted from the output shaft 225b of the forward-reverse switching device 225 to the sub-transmission 226. Then, the combined power is transmitted from the sub-transmission 226 to the rear-wheel differential mechanism 219 and the front-wheel transmission 220.

In the traveling power transmission device 215, when the front wheels 202 and the rear wheels 203 are to be driven, the power transmitted from the engine 205 to the input shaft 223 is input into the first motor generator 217 via the driving mechanism input shaft 299 and the gear driving mechanism 298, so that the first motor generator 217 is driven to generate electric power. The electric power thus generated can be supplied to the second motor generator 218 for driving. The supply of the electric power to the second motor generator 218 is performed such that the electric power thus generated is charged in the battery 222 and is supplied to the second motor generator 218 via the battery 222, or the electric power thus generated is not charged in the battery 222 and is directly supplied to the second motor generator 218 without the battery 222.

As illustrated in FIG. 4, a clutch 245 is provided over the output shaft 205b and the input shaft 223. The clutch 245 is changeable between an engaged state (an ON state) and a disengaged state (an OFF state) by a hydraulic electromagnetic valve or the like. When the clutch 245 is switched to the engaged state, the power from the engine 205 is transmitted to the electric transmission portion 216A and the gear transmission portion 216B, so that the hybrid transmission 216 is switched to a hybrid mode in which the front wheels 202 and the rear wheels 203 are driven by the power from the engine 205 and the driving force from the second motor generator 218, and electric power is generate by the first motor generator 217. When the clutch 245 is switched to the disengaged state, power transmission from the engine 205 to the electric transmission portion 216A and the gear transmission portion 216B is cut off, so that the hybrid transmission 216 is switched to an electrically-driven mode in which the front wheels 202 and the rear wheels 203 are driven only by the driving force from the second motor generator 218. As the clutch 245, a dry clutch can be used.

As illustrated in FIG. 4, the input shaft 223 is provided with a trochoid pump 281 to supply a lubricant to the motor generator portion 224 and the gear driving mechanism 230.

As illustrated in FIG. 3, the power take-off shaft 212 is supported by the rear portion of the transmission case 213. As illustrated in FIG. 4, in the transmission case 213, a work power transmission device 240 to transmit the power from the engine 205 to the power take-off shaft 212 is accommodated.

As illustrated in FIG. 4, the work power transmission device 240 includes the driving mechanism input shaft 299 connected to the input shaft 223, a rotating shaft 241 provided behind the driving mechanism input shaft 299 in a state where the rotating shaft 241 extends along the vehicle-body front-rear direction, the rotating shaft 241 including a front portion connected to a rear portion of the driving mechanism input shaft 299, a work clutch 242 connected to a rear portion of the rotating shaft 241, and a power take-off shaft transmission 243 to change the speed of the output from the work clutch 242 and transmit the output to the power take-off shaft 212. The axis of the rotating shaft 241 coincides with the axis of the input shaft 223. The input shaft 223 and the rotating shaft 241 are connected in an interlocking manner directly or via a joint.

In the work power transmission device 240, the power from the input shaft 223 is transmitted to the rotating shaft 241 and is transmitted from the rotating shaft 241 to the power take-off shaft 212 via the work clutch 242 and the power take-off shaft transmission 243. The work clutch 242 switches between an engaged state where the power from the engine 205 is transmitted to the power take-off shaft 212 and a disengaged state where power transmission from the engine 205 to the power take-off shaft 212 is cut off.

The above preferred embodiment deals with an example in which the outside diameter of the first motor generator 217 and the outside diameter of the second motor generator 218 are set to the same diameter, but the outside diameter of the first motor generator 217 may be different from the outside diameter of the second motor generator 218.

The above preferred embodiment deals with an example in which the first rotation axis 217c of the first motor generator 217 and the second rotation axis 218c of the second motor generator 218 are positioned along the vehicle-body width direction. However, the present invention is not limited to this, provided that the first rotation axis 217c and the second rotation axis 218c are disposed in a direction along the radial direction of the transmission case 213, e.g., a direction along the vehicle-body up-down direction, or the like.

The above preferred embodiment deals with an example in which the input shaft 223 extends between the first motor generator 217 and the second motor generator 218, above the first rotation axis 217c and the second rotation axis 218c, but the input shaft 223 may extend between the first motor generator 217 and the second motor generator 218, below the first rotation axis 217c and the second rotation axis 218c.

The above preferred embodiment deals with an example in which the low-speed planetary transmission portion 300 and the high-speed planetary transmission portion 310 are provided in the gear driving mechanism 230. However, the present invention is not limited to this. A transmission mechanism to change the speed by changing a shift gear, a transmission mechanism that uses a stepless speed variator, or the like may be used.

The above preferred embodiment deals with an example in which the engine 205 is provided in the front portion of the vehicle body, and the transmission case 213 is adjacently provided behind the engine 205, but the engine 205 may be provided in the rear portion of the vehicle body, and the transmission case 213 may be adjacently provided in front of the engine 205.

The above preferred embodiment deals with a configuration in which the engine 205 is connected to the transmission case 213, but the engine 205 and the transmission case 213 may be separated from each other without being connected to each other.

The above preferred embodiment deals with an example in which the front wheels 202 and the rear wheels 203 are provided as travel devices. However, the present invention is not limited to this. As the travel devices, a crawler travel device or a device in combination with wheels and a mini crawler may be used.

The above preferred embodiment deals with an example in which the power take-off shaft 212 is provided, but the power take-off shaft 212 may not be provided.

Preferred embodiments of the present invention can be applied to a work vehicle including an engine and a hybrid transmission. The hybrid transmission includes an electric transmission and a gear transmission in a state where the electric transmission and the gear transmission are positioned along the vehicle-body front-rear direction. The electric transmission includes a motor generator, and the gear transmission includes a gear driver without a motor generator. The hybrid transmission is operable to vary power from the engine and output the power to a travel device.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A work vehicle, comprising:
an engine;
a hybrid transmission including:
  an electric transmission; and
  a gear transmission;
the electric transmission and the gear transmission being positioned along a vehicle-body front-rear direction, the gear transmission including a gear driver, the hybrid transmission being operable to vary power from the engine and output the power to a travel device;
a transmission case in which the hybrid transmission is accommodated, the transmission case being provided in a vehicle body in a state where the transmission case is side by side with the engine along the vehicle-body front-rear direction; and
an input transmission; wherein
the electric transmission includes a first motor generator and a second motor generator and is on a side of the gear transmission on which side the engine is located;
the first motor generator is on a side of the second motor generator on which side the engine is located;
the second motor generator is on a side of the first motor generator on which side the gear transmission is located;
the work vehicle further comprises, on a side of the second motor generator on which side the gear transmission is located, an output transmission connecting the second motor generator to an input of the gear transmission to transmit an output from the second motor generator to the input;

the input transmission connects an input shaft of the transmission case to the first motor generator to input power from the input shaft into the first motor generator; and the input transmission is on a side of the first motor generator on which side the engine is located.

2. The work vehicle according to claim 1, wherein the input transmission is operable to increase the power from the input shaft and transmit the power to the first motor generator.

3. The work vehicle according to claim 1, wherein the first motor generator and the second motor generator are rotatable coaxially with the input shaft.

4. The work vehicle according to claim 1, wherein
the engine is provided in a front portion of the vehicle body; and
the transmission case is behind the engine.

5. A work vehicle, comprising:
an engine;
a hybrid transmission including:
an electric transmission; and
a gear transmission;
the electric transmission and the gear transmission being positioned along a vehicle-body front-rear direction, the gear transmission including a gear driver, the hybrid transmission being operable to vary power from the engine and output the power to a travel device; and
a transmission case in which the hybrid transmission is accommodated, the transmission case being provided in a vehicle body in a state where the transmission case is side by side with the engine along the vehicle-body front-rear direction; wherein
the electric transmission includes a first motor generator and a second motor generator and is provided between the engine and the gear transmission;
the first motor generator and the second motor generator are provided in a state where a first rotation axis of the first motor generator and a second rotation axis of the second motor generator extend along the vehicle-body front-rear direction;
the first rotation axis and the second rotation axis are parallel to each other;

the transmission case includes an input shaft extending in the vehicle-body front-rear direction between the first motor generator and the second motor generator; and the input shaft extends along the vehicle-body front-rear direction above the first rotation axis and the second rotation axis.

6. The work vehicle according to claim 5, wherein
the first rotation axis and the second rotation axis extend in a direction along a vehicle-body width direction in a state where the first rotation axis and the second rotation axis are parallel to each other.

7. The work vehicle according to claim 6, wherein
the input shaft extends along the vehicle-body front-rear direction above the first rotation axis and the second rotation axis; and
the input shaft includes an upper end above an upper end of the first motor generator and above an upper end of the second motor generator.

8. The work vehicle according to claim 5, wherein the first motor generator and the second motor generator have different outside diameters.

9. The work vehicle according to claim 5, wherein
the gear transmission includes:
a low-speed planetary transmission to combine engine power from the input shaft with motor power from the second motor generator into low-speed-side combined power and output the low-speed-side combined power; and
a high-speed planetary transmission to combine the engine power from the input shaft with the motor power from the second motor generator into high-speed-side combined power higher than the low-speed-side combined power and output the high-speed-side combined power;
a first one of the low-speed planetary transmission and the high-speed planetary transmission has a rotation axis coinciding with the first rotation axis of the first motor generator; and
a second one of the low-speed planetary transmission and the high-speed planetary transmission has a rotation axis coinciding with the second rotation axis of the second motor generator.

10. The work vehicle according to claim 5, wherein
the engine is in a front portion of the vehicle body; and
the transmission case is behind the engine.

* * * * *